INVENTOR
Stanley H. Ellis
Harold W. Herring
BY
W. O. Duesenberry
Claude Funkhouser
ATTORNEYS
Robert Thompson
AGENT

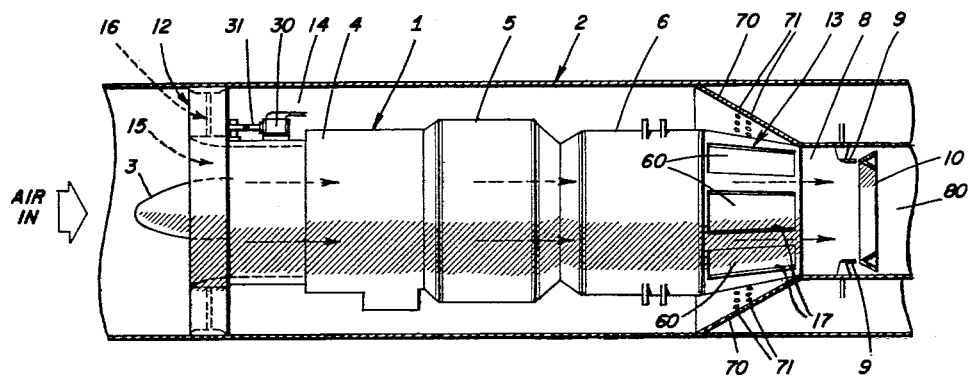
Oct. 27, 1964  S. H. ELLIS ETAL  3,153,904
TURBO-RAMJET CONFIGURATION
Filed Dec. 29, 1961  2 Sheets-Sheet 1
INVENTOR
Stanley H. Ellis
Harold W. Herring Oct. 27, 1964      S. H. ELLIS ETAL      3,153,904
TURBO-RAMJET CONFIGURATION
Filed Dec. 29, 1961                    2 Sheets-Sheet 2

United States Patent Office 3,153,904
Patented Oct. 27, 1964

3,153,904
TURBO-RAMJET CONFIGURATION
Stanley H. Ellis, Boca Raton, Fla., and Harold W. Herring, Acworth, Ga., assignors, by mesne assignments, to the United States of America as represented by the Secretary of the Navy
Filed Dec. 29, 1961, Ser. No. 163,376
7 Claims. (Cl. 60—35.6)

Three type engines commonly used in aircraft are the reciprocating engine, the turbojet and the ramjet. Of the three the reciprocating engine is the best at the lower speeds of the order of zero to three hundred and fifty miles per hour. The turbojet is efficient in the ranges of approximately five hundred miles an hour to twelve hundred miles per hour. Above twelve hundred miles an hour or mach 2 the ramjet is the most efficient of the three types of engines. For medium speed operation the turbojet has been mated with a propeller to form a turbo prop engine which is efficient in range from low speed up to around five hundred miles per hour. This turbo prop engine takes advantage of the low speed operating characteristics of a reciprocating engine and the medium range speed of a turbojet engine.

This invention relates to an analogous engine arrangement which combines the best features of the turbojet engine and the ramjet engine for a wide range of operating characteristics in the higher speeds from five hundred miles per hour on up to the multiple mach numbers. A combination engine such as the turboramjet uses the turbojet for the low speed operation such as take off and climbing. When a sufficient mach number is reached the turbojet can be cut out and the ramjet used. In this manner shorter runways can be used and a rocket assisted takeoff is not needed. This combination gives operating flexibility in that short runways can be used such as would be encountered in combat areas. Also there is a saving in fuel consumption since each engine would be operating in its most efficient ranges. This type of engine could be used in a multiple mission type aircraft. This multiple mission type aircraft could be used in tactical or close air support missions and it can also be used in high altitude, high performance reconnaissance, combat and intercept missions. Such multiple mission aircraft save on parts, storage and maintenance problems since there can be standardization in all of these areas. Also there is no need to check out pilots in different types of aircraft since they merely need to become proficient in this multiple mission aircraft.

Although the engines used in these types of aircraft have many desirable characteristics they are not without shortcomings or serious difficulties in the design. There have been many problems encountered in the design of the valving means for switching from one engine to the other. This is especially true in the exhaust end of the turboramjet engine. There is a need at the exhaust portion for a rugged, simple design, valving means that has an extremely high degree of reliability. The use of hydraulic or electrical actuators on these valving means is resplendent with shortcomings and problems. These problems are due in part to the heating at the rear of the engine which has an adverse effect on hydraulic or electrical actuators. This engine overcomes the shortcomings in that it uses floating hinged aperture type door that is actuated by the exhaust pressures of either the ramjet or the turbojet. In this manner there is no worry about the fact that the aperture door can be closed to the exhaust of the engine that would currently be in operation. If the door was closed on the exhaust gasses this could lead to either a flame out or an explosion of the engine.

Besides acting as a means for sealing the operating engine or non-operating engine the floating doors serve as an expansion joint between the engine and the afterburner section.

One object of this invention is to provide a turboramjet configuration.

Another object of this invention is to provide a floating door for sealing the turbojet from the ramjet engine.

Another object of this invention is to provide an expansion joint between the turboramjet engine and the after burner.

Another object of this invention is to provide a simple, reliable, rugged floating door to seal the exhaust gases of the operating engine from the non-operating engine.

Another object of this invention is to provide an engine actuated exhaust valve means for a turboramjet engine.

Another object of this invention is to provide a valve means for a turboramjet engine.

Another object of this invention is a valve means for switching between a turbo and ramjet engine.

Various other objects and advantages will appear from the following description of one embodiment of the invention, and the novel features will be particularly pointed out hereinafter in connection with the appended claims.

FIG. 1 is a sectional view of the turboramjet engine with the turbojet engine operating;

FIG. 2 is a sectional view of the engine with the ramjet operating.

FIG. 3 is a detailed view of the intake valve for the jet engine.

Figure 4:
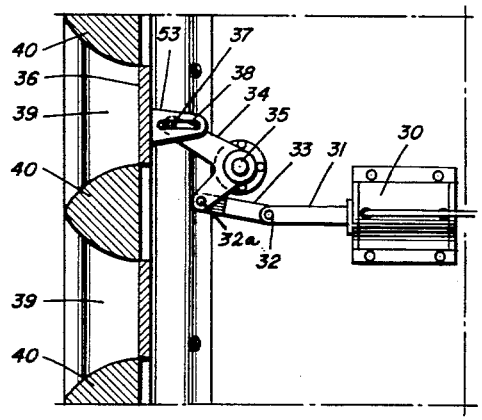
FIG. 4 is a detailed view of the valve actuated means with the valve closed.

In the embodiment of the invention illustrated in FIGS. 1 and 2, a turbojet 1 is supported within a casing 2. The turbojet engine has a diffuser or cone 3 at the front of the engine which is the intake section. The engine is of typical design which has a compressor section 4, a combustion chamber 5 and a turbo rotor blade section 6. The compressor section has the typical configuration of rotor blades and stator blades. The compressor section takes the intake air and compresses it into the combustion chamber 5 where the compressed air is mixed with the fuel and ignited, causing a subsequent expansion. This expanded gas is caused to exit through the turbine rotor section 6 and out through the exhaust 8 to give a propulsive force. In the exhaust section of the engine there is an afterburner section 80 which is designed to give added propulsion to the engine. This afterburner section has fuel injector nozzles 9 which spray an additional charge of fuel on the flameholder 10. This flameholder 10 is designed to diffuse the fuel and to hold the flame during afterburner operation.

The turbojet engine is supported by the annular housing 12 at the front of the engine and the spider housing 13 at the rear of the engine, which is constructed such that the engine is movable in the outer case permitting differental expansion.

The space between the turbojet engine 1 and the outer casing 2 form an annular bypass duct 14 which passes air to the ramjet engine when the ramjet is in operation and the turbojet is shut off. The annular support housing 12 also serves as a means to control the air intake into either the turbojet 1 or the ramjet. In this manner the annular housing 12 has alternately opening intake sections 15 and 16 which are for air intake into the turbojet or for the ramjet respectively.

The spider housing 13 at the rear of the jet engine has openings 17 around its periphery. These openings 17 are designed to allow the ramjet air to pass by the jet engine. As can be seen by FIG. 2 when the ramjet is in operation the doors are closed on the exhaust of the turbojet engine and thereby effectively form an exhaust cone.

Figure 5:
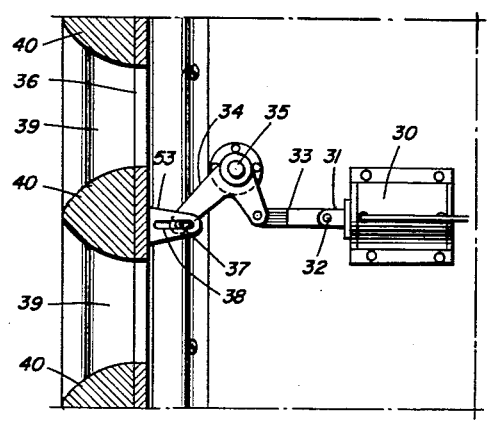
FIG. 5 is a detailed view of the valve actuating means with the valve opened.

FIGS. 3, 4 and 5 show detailed views of the air intake control valve. The intake valve is controlled by an actuator 30 which may be an electrical, pneumatic or a hydraulic actuator. This actuator or servo 30 operates on the plunger arm 31 and causes it to be pulled away or pushed toward the actuator. A linkage arm 33 is pivoted at one end on the plunger 31 by pin 32 and on a bell crank arm 34 at pin 32a on the other end. The bell crank 34 is pivoted on pin 35 and is adapted to actuate the sliding doors 36. The second arm of the bell crank 34 has a pin 37 which is adapted to slide in a slot 38 of the connection 53 which is secured to the rear of the sliding door 36. When the sliding doors 36 are opened it allows air to enter the opening 39 which is formed between the inlet 40.

As can be seen from the sectional view of FIG. 3 the sliding door 36 is secured by the annular rings 41 and 42. The openings in the annular rings are designed to accept the L shaped legs 43 and 44 of the door 36.

Figure 6:
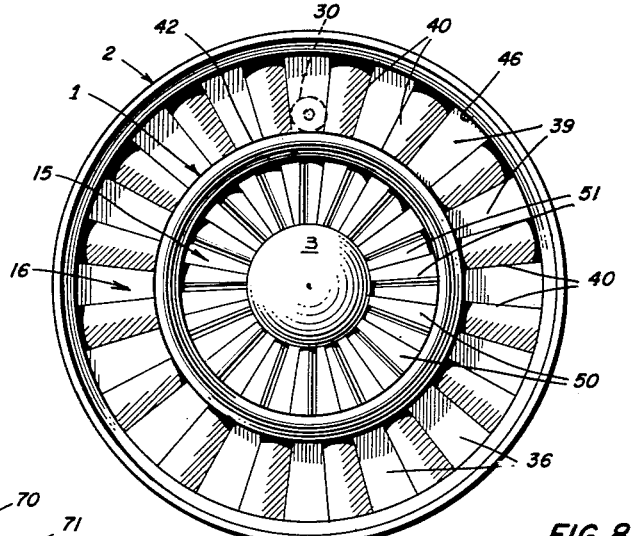
FIG. 6 is a front view of the intake of the jet engine.

FIG. 6 shows a front plane view of the engine intake. The outer annular openings are the intake for the ramjet engine. The inner annular openings are for the intake for the turbojet engine. At the very center is the intake cone 3 for the turbojet engine 1. As the doors 36 slide they will either open the ramjet intake 16 or the turbojet intake 15. The ramjet intake is formed between the annular rings 41 and 42 and is indicated by the openings 39. The turbojet intake openings 50 are located between the radial segments 51, annular ring 42 and the nose cone 3. As can be seen from the drawing either the opening 39 of the ramjet engine or the opening 50 of the turbojet engine will be open to allow air at any one instant but not both.

Figure 7:
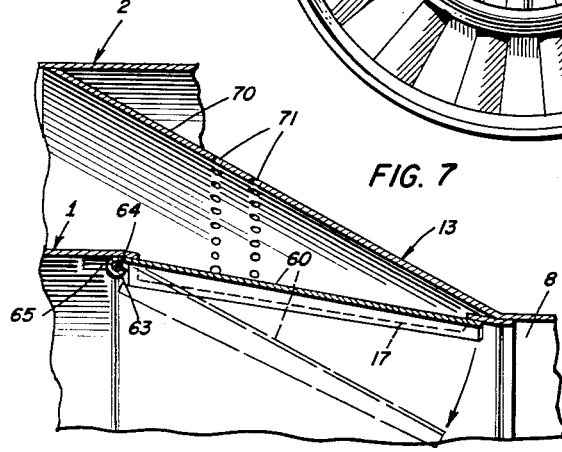
FIG. 7 is a detailed view of the floating door at the exhaust end of the engine.
Figure 8:
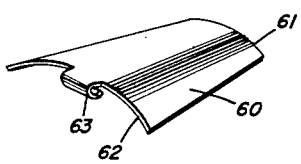
FIG. 8 is an isometric view of the floating door illustrated in FIG. 7.

FIGS. 7 and 8 show the floating doors 60 for the exhaust of the turboramjet engine. FIG. 8 shows a detailed view of the door 60 alone. FIG. 7 shows a view of the door 60 when connected for operation to the engine 1. As can be seen from FIG. 8, the door 60 has a curved surface and is narrower at the end 61 than at the end 62. This curved surface aids in forming a smooth exhaust surface. The wider end 62 has a hinge 63 which is secured to the jet engine and when the door is connected in operation it is hinged at point 65 by a pin 64 on the turbojet engine. In this manner, when the turbojet engine 1 is operating, the pressure of the exhaust gases forces the doors 60 to close on the bypass duct 14 of the ramjet engine. When the ramjet engine is operating and the turbojet engine 1 is cut off, the pressure of the intake air from the ramjet bypass duct will cause the doors 60 to close on the exhaust section of the non operating turbojet engine since the turbojet engine will have only a very low pressure which will be caused by air leakage.

The wall 70 which is located at the rearward part of the engine has relief ports 71 which allow static air or intake air leakage to escape out of the rearward part of the engine. Without such relief ports air pressure could possibly build up in the ramjet intake bypass duct. Such a build up of air pressure could cause a fluttering or an opening or closing of the doors 60. No relief ports are needed for the turbojet engine when it is in closed condition since the doors 60 do not close on each other completely but leave an opening at the rear of the jet engine which is large enough to exhaust the static air or the air leakage.

As can be seen in FIGS. 1 and 2 the afterburner section 80 acts as an afterburner for the turbojet engine for added thrust or propulsion in an emergency. The afterburner section 80 also acts as a combustion chamber for the ramjet configuration. Since the afterburner performs this dual function a control means can be employed which will permit the same control lever to be used for controlling the afterburner during either ramjet or turbojet operation. This control lever can control the fuel injectors 9 which injects the fuel on to the flameholder 10. This has the added advantage that the afterburner can be used in the turbojet phase during takeoff and climb and for intercept purposes. When the plane or aircraft reaches desired altitude or speed the turbojet engine can be shut off while the ramjet engine is opening. In this way you are able to switch from the turbojet to the ramjet without any loss of operating efficiency since the afterburner is still in use or in continuing use.

It will be understood that various changes in the details, materials, steps and arrangements of parts, which have been herein described and illustrated in order to explain the nature of the invention, may be made by those skilled in the art within the principle and scope of the invention as expressed in the appended claims.

What is claimed is:

1. A turbo-ramjet engine including a turbojet housing enclosing a turbojet, an annular casing spaced from and enclosing said housing, said housing and said casing forming a bypass duct, a sliding fan-type valve means at the intake end of the engine, said valve means being arranged to simultaneously control the air intake to the ramjet and the turbojet, a combustion chamber at the exhaust end of the engine, said combustion chamber being arranged so as to accept the exhaust gases from the turbojet when operating or air from the bypass duct when open, a conical rearwardly extending wall positioned in the downstream end of said bypass duct and restricting the flow of gases therethrough, a secondary fuel injector and an associated flame holder being positioned in the exhaust chamber, a spider housing attached to the end of said turbojet engine, said spider housing tapering rearwardly and having a plurality of spaced openings in its conical surface, a series of hinged arcuate shaped doors having one end connected to said spider housing to control the flow of gases passing through said openings, each of said doors being arranged to pivot freely about its connected end and contact one another to form a variable sized truncated cone, said truncated cone size being varied by the differential pressure between the ramjet intake and the turbojet exhaust, said hinged doors being arranged so that the top of the truncated cone is enlarged to seal the turbojet exhaust from the ramjet air intake when the turbojet is operating and to close and form a streamlined cone for the ramjet air intake when the ramjet is operating, a second combustion chamber at the exhaust end of the engine, said second combustion chamber acting alternately as an afterburner for turbojet operation and as a combustion chamber for ramjet operation.

2. A turbo-ramjet engine including a turbojet engine, a housing enclosing said turbojet engine, an annular casing spaced from and enclosing said housing, said housing and said casing forming an annular duct therebetween, baffle means positioned in said annular duct for directing the flow of air in said annular duct, pressure relief means in said baffle means, an inlet at the forward end of said turbojet engine and said annular duct, a plurality of spaced radial stationary guide vanes mounted in each of said inlets, a plurality of spaced radial movable valves mounted in each of said inlets, actuating means for rotating said valves about the engine axis for simultaneously controlling the flow of air into said turbojet intake and said annular duct, afterburner means positioned downstream of said turbojet exhaust, valve housing means attached to the exhaust end of said turbojet engine, valve means mounted in said valve housing, said valve means being movable to seal said annular duct from the afterburner section when said turbojet is operating and to allow airflow from said annular duct to said afterburner section when said ramjet is operating.

3. In a device of the character described in claim 2 wherein said baffle means comprises a conical wall which has its larger end secured to the inner wall of said casing, the smaller end of said conical wall terminating at the point of intersection with said valve housing means.

4. In a device of the character described in claim 3 wherein said pressure relief means comprises a plurality of apertures in said conical wall thereby preventing any undesired build-up of pressure in that region.

5. In a device of the character described in claim 4 wherein said actuating means comprises a hydraulic actuator connected to a source of fluid pressure and linkage to move said movable valves from a first position to its second position.

6. In a device of the character described in claim 5 wherein said valve housing means comprises a conical spider, said conical spider having its larger end secured to the exhaust end of said turbojet engine, a plurality of spaced openings in spider housing, the smaller end of said conical spider contacting said conical wall at its smaller end.

7. In a device of the character described in claim 6 wherein said valve means comprises a plurality of valves, each of said valves having a wider end and a curved outer surface, the wider end of each of said valves being secured to said spider housing to control the flow of gases through said openings in said spider housing, said valve means being movable to an open position whereby said annular duct is closed, said valve means movable also to a closed position whereby said annular duct is open to said afterburner region.

References Cited in the file of this patent

UNITED STATES PATENTS

| | | |
|---|---|---|
| 2,909,894 | O'Donnell | Oct. 27, 1959 |
| 2,934,895 | Gregory et al. | May 3, 1960 |
| 3,037,344 | Morris | June 5, 1962 |

FOREIGN PATENTS

| | | |
|---|---|---|
| 871,016 | Great Britain | June 21, 1961 |